United States Patent [19]

Meyers et al.

[11] 3,873,693

[45] Mar. 25, 1975

[54] IONOMYCIN

[75] Inventors: Edward Meyers, East Brunswick;
Dorothy S. Slusarchyk, Belle Mead;
Wen-Chih Liu, Princeton Junction,
all of N.J.

[73] Assignee: E. R. Squibb and Sons, Inc.,
Princeton, N.J.

[22] Filed: Mar. 11, 1974

[21] Appl. No.: 449,811

[52] U.S. Cl. .............................. 424/122, 195/80 R
[51] Int. Cl. ............................................. A61k 21/00
[58] Field of Search ................... 424/122; 195/80 R

[56] References Cited
UNITED STATES PATENTS 3,767,799   10/1973   Vertesy et al...................... 424/122

Primary Examiner—Jerome D. Goldberg
Attorney, Agent, or Firm—Lawrence S. Levinson;
Merle J. Smith

[57] ABSTRACT

Ionomycin is a new antibiotic with antimicrobial properties. A method for producing this antibiotic by means of the microorganism *Streptomyces conglobatus* is described.

5 Claims, 2 Drawing Figures

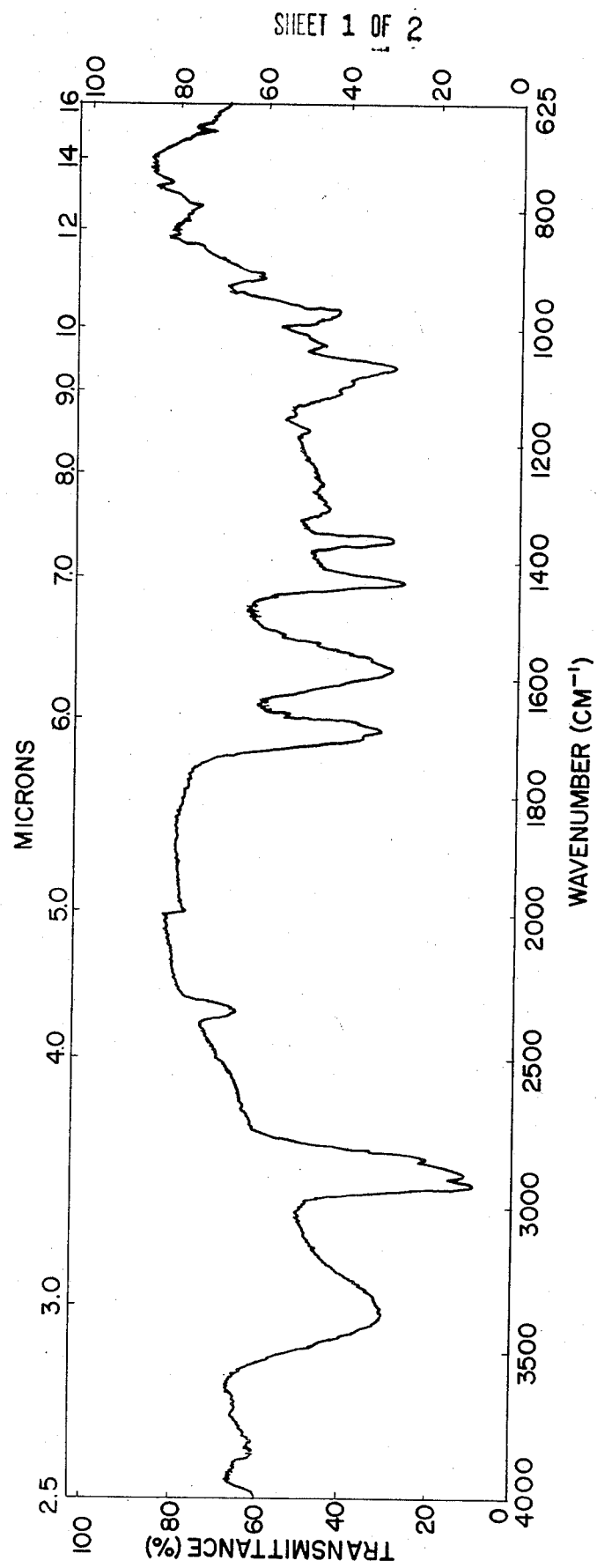
FIG. 1 INFRARED SPECTRUM OF ANTIBIOTIC IONOMYCIN

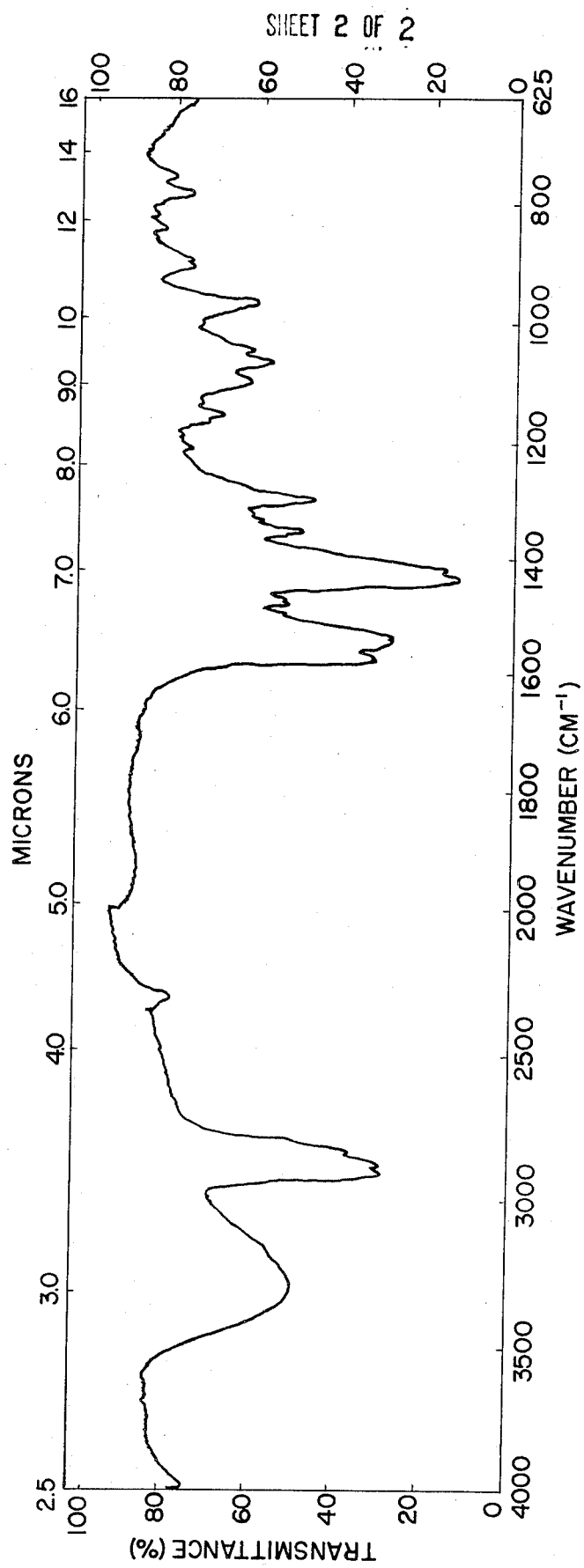
FIG. 2 INFRARED SPECTRUM OF ANTIBIOTIC IONOMYCIN, CALCIUM SALT

IONOMYCIN

SUMMARY OF THE INVENTION

This invention relates to a new antibiotic named ionomycin and to a method for its production. This antibiotic is obtained by cultivating the microorganism *Streptomyces conglobatus* ATCC 31005 in an aqueous nutrient medium comprising an assimilable carbohydrate and an assimilable nitrogen source under submerged aerobic conditions until substantial antibiotic activity is imparted to the medium.

The antibiotic is recovered from the fermentation broth by filtering off the mycelium and the antibiotic is extracted from the mycelium with an alcohol, preferably methanol. The alcohol solution is concentrated and further extracted, e.g., with an organic solvent such as ethyl acetate. The antibiotic is recovered from the organic phase, e.g., by concentrating and by purifying it by chromatography.

FIG. 1 shows the infrared spectrum of the antibiotic ionomycin (in KBr).

FIG. 2 shows the infrared spectrum of the calcium salt of ionomycin (in KBr).

DETAILED DESCRIPTION OF THE INVENTION

The microorganism useful for the preparation of ionomycin is a species of Streptomyces isolated from a soil sample and is designated *Streptomyces conglobatus*. A culture of the living organism has been deposited and made a part of the stock culture collection of American Type Culture Collection (Rockville, Md.) available under the accession number ATCC 31005.

For isolating and characterizing the organism, a portion of the soil sample is shaken in sterile distilled water and plated on a nutrient agar containing:

|  | Grams |
|---|---|
| Agar | 15 |
| Glycerol | 10 |
| Citric Acid | 1.2 |
| (NH$_4$)$_2$HPO$_4$ | 0.4 |
| KCl | 0.08 |
| MgCl$_2$.6H$_2$O | 0.418 |
| MnCl$_2$.4H$_2$O | 0.036 |
| FeCl$_3$.6H$_2$O | 0.023 |
| ZnCl$_2$.6H$_2$O | 0.021 |
| CoCl$_2$.6H$_2$O | 0.004 |
| Distilled water to 1,000 ml. |  |

The medium is adjusted to pH 7.0 and sterilized in an autoclave at 121° C for 30 minutes. After 7 to 10 days incubation at 25° C, colonies of *Streptomyces conglobatus* are isolated from the plated soil. These isolated colonies are then grown on a medium containing:

|  | Grams |
|---|---|
| Beef Extract | 1.0 |
| Yeast Extract | 1.0 |
| NZ amine A | 2.0 |
| Glucose | 10.0 |
| Agar | 15.0 |
| Distilled water to 1,000 ml. |  |

The medium is adjusted to pH 7.3 and autoclaved at 121° C for 30 minutes.

The organism is a member of the gray spore color series of Pridham. It produces a spore mass that is medium gray (ISCC No. 265) in color, matching color chip (2Fe) in the Color Harmony Manual. At 10 days on standard International Streptomyces Project medium ISP-3 (oatmeal agar) sporulation is sparse and powdery. Sporulated colonies are medium gray with a white asporogenous fringe. The colony reverse is colorless to a faint greenish gray tinge, with no soluble pigment produced. On yeast extract-malt extract agar (ISP-2) the aerial mycelium has a salt and pepper appearance from areas of dense sporulation in gray to white non-sporulating areas. The colony reverse ranges from colorless to a faint yellowish orange, with no soluble pigment. On inorganic salts-starch agar (ISP-4), aerial mycelium is abundant and gray in color. The colony reverse is colorless with no soluble pigment produced.

Microscopically, the spore mass is produced on sporophores that are arranged predominately in compact spirals forming ball-like clusters along the axial hyphae. The spore surface is hairy, as seen by electron microscopy.

The culture characteristics of *Streptomyces conglobatus* ATCC 31005 are as follows: no melanoid pigments are produced in proteinaceous media. Good vegetative growth occurs over the temperature range of 15°C to 38° C in tryptone, yeast extract broth when grown in shaken culture.

The carbohydrate utilization pattern of Streptomyces conglobatus is set out below:

| glucose | + Positive control |
|---|---|
| mannitol | − |
| inositol | − |
| sorbitol | − |
| d-xylose | (+)[1] |
| l-arabinose | (+) |
| rhamnose | − |
| fructose | + |
| trehalose | + |
| melibiose | − |
| galactose | + |
| raffinose | + |
| sucrose | + |
| lactose | (+) |

[1]Responses in brackets indicate growth somewhat less than the positive control

The Antibiotic

*Streptomyces conglobatus* ATCC 31005 produces ionomycin, an antibiotic that possesses activity against bacteria. To form the antibiotic, *Streptomyces conglobatus* is grown at about 25° C under submerged aerobic conditions in an aqueous nutrient medium contianing an assimilable carbohydrate and nitrogen source. The fermentation is carried out for approximately 60 to 150 hours, preferably about 144 hours, at the end of which time the antibiotic has been formed.

After the fermentation has been completed, filter aid is added to the broth which is then filtered. The filtrate is extracted with a water immiscible organic solvent such as a lower alkanol like butanol, or a lower alkyl ester like ethyl acetate, butyl acetate, etc. or a chlorinated hydrocarbon like chloroform or lower alkyl ketone like methyl isobutyl ketone, etc. The organic phase is dried and concentrated to a syrup. Further purification is effected by column chromatography, for example, on silicic acid, and eluting with a solvent system such as benzene, chloroform (preferably 1:1 v/v) and then with chloroform, ethyl acetate (preferably 1:1 v/v). The biologically active fraction is further purified by then rechromatographing on a silicic acid column, elution being carried out, according to a preferred method, with a sequence of eluants, these being, in the order of use, benzene, chloroform, (about 1:1, v/v); chloroform; ethyl acetate, chloroform (about 1:3, v/v); ethyl acetate. The biologically active fractions obtained by this procedure are pooled and further purified by preparative scale chromatography on silica gel plates with 4% methanol in chloroform as the developing solvent. Final purification is obtained by crystallization from an organic solvent such as benzene, hexane, chloroform and the like. This system isolates the antibiotic as the calcium salt and provides a crystalline form. Ionomycin, the free acid, is obtained from the calcium salt by acidification with an acid, e.g., a mineral acid like sulfuric acid, as illustrated in the examples which follow. Other salts are formed by treating the free acid with a base containing the desired salt forming ion. Salts such as the silver salt, alkali metal salts like the sodium or potassium salts, or the alkaline earth metal salts are formed in this manner. Since ionomycin itself as the free acid is a colorless oil, the crystalline salts are preferred for most uses for convenience of handling. However, ionomycin and its salts are all antimicrobially active.

Based on the physical and chemical measurements, ionomycin appears to be a member of the polyether group of antibiotics. The molecular weight and elemental analysis of ionomycin serve to distinguish this antibiotic from other reported members of this group, e.g., monensin, nigericin, salinomycin. But it is most readily differentiated by the UV adsorption maximum (in the form of calcium salt) at 300 nm, none of the other reported polyethers having this characteristic.

The invention is further illustrated by the following examples.

EXAMPLE 1

Tomato paste-oatmeal agar slants are seeded with *Streptomyces conglobatus* ATCC 31005. They are incubated 10–14 days and then used to inoculate 100 ml. of aqueous soybean meal contained in 500 ml. Erlenmeyer flasks. The composition of the germination medium is:

| | Grams |
|---|---|
| Toasted nutrisoy flour | 15 |
| Hi starch | 15 |
| Glucose | 50 |
| $CoCl_2.6H_2O$ | 0.005 |
| $CaCO_3$ | 10 |
| Distilled water to 1,000 ml. | |

The medium is sterilized for 30 minutes at 121°C and at 15 lbs. pressure. The germination flasks are incubated at 25°C for 96 hours on a rotory shaker, operating at 280 r.p.m. with a 2 inch throw.

Fermentation Conditions

A 5% (v/v) transfer is made from the germination flask to 500 ml. Erlenmeyer flasks containing 100 ml. of the following medium:

| | Grams |
|---|---|
| A.D.M. extracted soybean meal | 30 |
| Glucose | 50 |
| $CaCO_3$ | 7 |
| Distilled water to 1,000 ml. | |

The medium is sterilized for 30 minutes at 121° C. and at 15 lbs. steam pressure. The fermentation flasks are incubated and agitated as are the germination flasks. Samples are taken at 3, 5 and 7 days. They are examined after centrifuging off the mycelium and extracting the mycelium with a volume of methanol equal to that of the supernate. Both supernatant and methanolic extracts are examined by thin-layer chromatography and by bioassay. For chromatography, suitable amounts are spotted on silica gel plates and developed with a solvent consisting of 4% methanol in chloroform. In this system, ionomycin has an $R_f$ value of approximately 0.35. The antibiotic is detected by bioautography against *Staphylococcus aureus* 209P.

EXAMPLE 2

A 250 liter batch of *Streptomyces conglobatus* ATCC 31005 is fermented in a 100 gallon stainless steel vessel with the media and operating conditions described below.

Stage 1

Inoculum: Culture of *Streptomyces conglobatus* ATCC 31005 preserved by lyophilization in milk and grown out on tomato paste-oatmeal agar slant. Surface growth from a slant is suspended into 11 ml. of 0.01 percent Dupanol solution and is used as the source of inoculum.

| Medium: | Grams |
|---|---|
| Toasted Nutrisoy flour | 15 |
| Hi starch | 15 |
| Glucose | 50 |
| $CoCl_2.6H_2O$ | 0.005 |
| $CaCO_3$ | 10 |
| Distilled water to 1,000 ml. | |

1,500 ml. of this medium in a 4-liter flask is incubated 96 hours on a rotary shaker. The shaker operates at 125 r.p.m. with a 2-inch throw.

Stage 2

Inoculum: 1,500 ml. from the first stage.
Medium: Same as stage 1, with the addition of 0.5 grams Ucon LB 625 as an antifoam agent.

Thirty (30) liters of the medium containing the inoculum is incubated for 96 hours. During incubation, the broth is aerated at the rate of 2.3 cubic feet per minute with agitation at 220 r.p.m.

Stage 3

Inoculum: 12,500 ml. from stage 2.

| Medium: | Grams |
|---|---|
| A.D.M. extracted soybean meal | 30 |
| Cerelose | 55 |
| $CaCO_3$ | 7 |
| Ucon LB 625 | 0.5 |

Two hundred fifty (250) liters of the medium containing the inoculum is incubated for 144 hours. During incubation, the broth is agitated at 155 r.p.m. and aerated at the rate of 10 cubic feet per minute.

EXAMPLE 3

22.7 kilograms of filter aid (Hyflo) is added to 473 liters of pooled fermentation broth obtained as described in Example 2, and the insoluble material is removed by filtration to yield approximately 100 kg. of mycelial cake, and 360 liters of filtrate.

EXAMPLE 4

The filter cake (100 kg.) obtained in Example 3, is extracted three times with 200 liter portions of methanol. The cake is filtered between extractions. The combined methanol extracts are concentrated to 4.0 liters in vacuo to remove the methanol. The resulting aqueous suspension is added to the 360 liters of filtrate obtained in Example 3.

EXAMPLE 5

The combined aqueous layers are extracted three times with 130 liter portions of ethyl acetate saturated with water. The pooled ethyl acetate extracts are concentrated in vacuo to yield approximately 2 kilograms of a brown syrup. Approximately 400 grams of the syrup is dissolved in 300 ml. of a solvent consisting of benzene, chloroform, 1:1, v/v and placed on top of a silicic acid column, 7.5 cm × 90 cm containing 1,000 grams of silicic acid packed in the benzene, chloroform, 1:1, v/v solvent. The column is eluted with this solvent, approximately 3 liters, and then with 3 liters of chloroform, ethyl acetate 1:1, v/v. The bioactive fractions, as determined by paper disc-agar diffusion assay against Staphylococcus aureus 209P, are combined and concentrated to dryness, yielding 50 grams of material.

EXAMPLE 6

The residue, 50 grams dissolved in benzene, chloroform, 1:1, v/v, is placed on top of a silicic acid column 4.5 cm × 60 cm., containing 300 grams of silicic acid packed in the benzene, chloroform, 1:1, v/v solvent and eluted firstly with the same solvent as used to pack the silicic acid (1.5 liters) secondly with chloroform, 1.5 liters, then with chloroform, ethyl acetate, 3:1, v/v, 1.5 liters and finally, with 1.5 liters of ethyl acetate. The chromatography is followed by paper disc-agar diffusion assay against Staphylococcus aureus 209P. The active fractions are pooled, and the pool concentrated to dryness to yield approximately 3 grams of residue.

EXAMPLE 7

Three (3) grams of residue, obtained in Example 6, dissolved in 10 ml. of chloroform, is streaked approximately 2 cm from the bottom of 20 cm × 20 cm 1,00 $\mu$ layer silica gel plates. The plates are developed with 4 percent methanol in chloroform. Ionomycin, calcium salt, appearing as a strong dark band under an ultraviolet lamp (254 m$\mu$ lamp) ($R_f$ approximately 0.35) is scraped off the plate and eluted from the silica gel with acetone.

The acetone eluate is concentrated to dryness, and the residue, dissolved in a small volume of chloroform is rechromatographed on silica gel plates as described above. The process may be repeated one or two more times to effect complete purification.

Crystallization of ionomycin, calcium salt, is accomplished from hexane. Ionomycin, calcium salt, crystallizes as colorless, rectangular plates, approximately 500 mg. being obtained.

Analysis — (percent): C, 66.00, H, 9.17, Ca, 5.77.
UV: max in methanol 300 nm ($E_{1cm}^{1\%}$ 290).
M.P. 205°–206° C.
M.W. 746 (by high resolution mass spectrometry)
Empirical formula $C_{41}H_{70}O_9Ca$
I.R. — as shown in FIG. 2

Solubility — soluble in hexane, benzene, chloroform, acetone; insoluble in methanol, ethanol, water, dilute acid (e.g., hydrochloric) and dilute alkali (e.g., sodium hydroxide)

EXAMPLE 8

The free acid of ionomycin is prepared from the calcium salt obtained in Example 7. 20 mg. of the calcium salt is dissolved in 20 ml. of hexane and shaken with an equal volume of 1.0 N sulfuric acid for 10 minutes. The layers are separated and the upper layer is washed with 5 ml. of distilled water. After separation, the upper layer is evaporated to dryness under reduced pressure, yielding 15 mg. of a colorless oil, which is the free acid of ionomycin. The I.R. spectrum of ionomycin is shown in FIG. 1 and is also characterized by an absorption maximum at 280 nm in the U.V.

EXAMPLE 9

Two-fold tube dilution assays using the crystalline material obtained in Example 7 against several microorganisms show the following results:

| Organism | MIC (ug/ml) |
| --- | --- |
| Staphylococcus aureus 209P | 0.19 |
| Steptococcus pyogenes C203 | 0.39 |
| Escherichia coli ATCC 10,536 | ≥50 |
| Pseudomonas aeruginosa SC 8329* | ≥50 |
| Candida albicans SC 5314* | ≥50 |
| Trichomonas vaginalis SC8560* | ≥12.5 |

*Squibb Culture Collection

The antibiotic ionomycin and its salts are thus useful as antimicrobial agents to combat infections caused by various microorganisms, e.g., Staphylococcus aureus, Streptococcus pyogenes and Trichomonas vaginalis. The antibiotic or a physiologically acceptable salt thereof may therefore be used as an antimicrobial agent either as an environmental disinfectant, e.g., in a spray or dust containing up to about 1% of the substance in a conventional carrier, or to combat infections in various animal species due to microorganisms such as those enumerated, e.g., topically in a conventional cream or ointment containing up to about 1% of the substance or in an injectable dosage form in mice or fowl at about 50 to 125 mg./kg./day.

What is claimed is:

1. The antibiotic ionomycin, said antibiotic having the infrared spectrum in FIG. 1; its calcium salt having the infrared spectrum in FIG. 2, the following approximate elemental analysis: C, 66.00, H, 9.17, Ca, 5.77, melting point 205°–206°, molecular weight 746 and soluble in hexane, benzene, chloroform and acetone.

2. The calcium salt of ionomycin as described in claim 1.

3. A process for producing ionomycin which comprises cultivating Streptomyces conglobatus ATCC 31005 in an aqueous nutrient medium comprising an assimilable carbohydrate and an assimilable nitrogen source under submerged aerobic conditions until substantial antibiotic activity is imparted to the medium.

4. A process as in claim 3 wherein the microorganism is cultivated at about 25° C.

5. A process as in claim 4 wherein the fermentation is continued for about 60 to 150 hours.

* * * * *